(12) United States Patent
Spijker et al.

(10) Patent No.: US 9,097,275 B2
(45) Date of Patent: Aug. 4, 2015

(54) SYSTEM OF FASTENING ELEMENTS DEFINED BY A NUT AND A DRAW BAR; DRAWBAR AND NUT

(75) Inventors: Johannes Gerhardus Spijker, Dedemsvaart (NL); Ferdinand Schottert, Dedemsvaart (NL); Herman Johan Lüth, Markelo (NL); Jordy Bloemendal, Aalten (NL); Christijan Albers, Monaco (FR); Erik Lambertus Johannes Klein Nagelvoort, Hoofddorp (NL)

(73) Assignee: SPEED-FIX IP B.V., Dedemsvaart (NL)

( * ) Notice: Subject to any disclaimer, the term of this patent is extended or adjusted under 35 U.S.C. 154(b) by 316 days.

(21) Appl. No.: 13/574,485

(22) PCT Filed: Jan. 21, 2011

(86) PCT No.: PCT/NL2011/050039
§ 371 (c)(1),
(2), (4) Date: Jan. 4, 2013

(87) PCT Pub. No.: WO2011/090382
PCT Pub. Date: Jul. 28, 2011

(65) Prior Publication Data
US 2013/0101371 A1    Apr. 25, 2013

(30) Foreign Application Priority Data
Jan. 21, 2010   (NL) ..................... 2004126

(51) Int. Cl.
*F16B 37/08*   (2006.01)
*F16B 39/14*   (2006.01)
*F16B 43/00*   (2006.01)

(52) U.S. Cl.
CPC ............. *F16B 37/08* (2013.01); *F16B 37/0842* (2013.01); *F16B 39/14* (2013.01); *F16B 43/004* (2013.01)

(58) Field of Classification Search
CPC ............. F16B 37/0857; F16B 37/0842; F16B 37/0807; F16B 39/14
USPC .......................... 411/433, 437, 525–527, 247
See application file for complete search history.

(56) References Cited

U.S. PATENT DOCUMENTS

| | | | | | |
|---|---|---|---|---|---|
| 1,069,451 | A | * | 8/1913 | Marston | 411/437 |
| 2,566,593 | A | * | 9/1951 | Bloomfield | 411/520 |
| 2,798,748 | A | * | 7/1957 | Maurer | 403/372 |
| 4,480,490 | A | * | 11/1984 | Inoue | 74/401 |
| 6,461,092 | B2 | * | 10/2002 | Tseng | 411/383 |
| 6,705,813 | B2 | * | 3/2004 | Schwab | 411/526 |
| 7,207,762 | B2 | * | 4/2007 | Teal | 411/526 |
| 8,439,620 | B2 | * | 5/2013 | Mellyn | 411/433 |
| 8,568,073 | B2 | * | 10/2013 | Eberle et al. | 411/112 |
| 2005/0008456 | A1 | * | 1/2005 | Birkelbach et al. | 411/526 |

* cited by examiner

Primary Examiner — Flemming Saether
(74) Attorney, Agent, or Firm — Banner & Witcoff, Ltd.

(57) ABSTRACT

The system (100) of fastening elements formed by a coupling rod (2) and a nut comprises a support structure or blade (30) provided with resilient tongues. The tongues will bend upward during a rotationless translation of the coupling rod along the nut. After further tightening by means of rotation in an opposite longitudinal direction the tongues are pressed flat against a stop surface (93) of the base body. As a result the support structure (30) fixes itself into the base body (9).

13 Claims, 7 Drawing Sheets

SYSTEM OF FASTENING ELEMENTS DEFINED BY A NUT AND A DRAW BAR; DRAWBAR AND NUT

RELATED APPLICATION DATA

This application is a National Stage Application under 35 U.S.C. 371 of co-pending PCT application PCT/NL2011/050039, designating the United States and filed Jan. 21, 2011, titled "System of Fastening Elements Defined by a Nut and a Drawbar; Drawbar and Nut", which claims the priority benefit of NL Patent Application No. 2004126, filed Jan. 21, 2010, titled "System of Fastening Elements Defined by a Nut and a Drawbar; Drawbar and Nut", the entire disclosure of each of which is hereby incorporated by reference for all purposes.

FIELD OF THE INVENTION

The invention relates to a system of fastening elements formed by a coupling rod and a nut. The invention also relates to such a fastening element. The invention further relates to a method for realizing a screw thread connection using a system according to the invention.

BACKGROUND OF THE INVENTION

Applying a system of a bolt and a nut for fastening purposes has already been known for several centuries. Although bolts and nuts can be embodied in diverse ways, the bolt is generally formed by a round rod which is provided with a thickened head and on the outside of which a screw thread profile is arranged, and the nut is generally formed by a ring, the outer side of which generally takes an angular form and the inner side of which is provided with a complementary screw thread profile. A relatively durable and strong screw thread connection between the bolt and the nut can be realized by arranging the nut round the bolt by means of axial rotation. Although the realized connection is generally considered as such to be sufficiently strong, it is a drawback of the known nut-bolt connection that, particularly in the case a relatively long bolt is applied, realizing the screw thread connection is relatively time-consuming.

Diverse solutions have been proposed for the purpose of realizing a quicker threaded connection. The screw thread on one of the fastening elements, usually the nut, is replaced here by a number of protrusions in radial direction. The bolt can be pulled along the protrusions to a desired position.

U.S. Pat. No. 5,451,124 discloses wire-like protrusions in the form of a wire brush. The protrusions are fixed in a holder on an outer ring and are directed toward a central axis. Because these protrusions are longer than the distance between the bolt and the outer ring, they will bend when the bolt is pulled along the protrusions. The wire-like protrusions herein come to lie in the groove of the screw thread. Since they all bend in one direction, this creates resistance to translation in the reverse direction. The drawback of such wire-like protrusions is however the lack of force applied. The eventual threaded connection is thus of a far lesser quality than the conventional screw thread connection.

GB 2,308,154 discloses a construction with a number of flexible, resilient protrusions or tabs adjacently of each other in the peripheral direction. These tabs are ordered in two rows and at a mutual distance of $1/12$th of the pitch of the thread. They are oriented inclining inward such that, when one tab engages in the screw thread profile (i.e. the groove thereof) in the natural state, the other protrusions are not fully engaged in the screw thread profile. During tightening of the nut the other tabs will bend and engage further in the screw thread profile. This construction has the drawback, among others, that the placing of the tabs depends on the specific screw thread profile. The tabs can here spring loose of the screw thread profile or not become properly secured, for instance when the screw thread has been damaged.

Other solutions, such as those of DE 19929016, NL 1014082 and EP 1217230, are based on the principle of a barb. It is even more the case here than in GB 2,308,154 that the screw thread is fixed by curved protrusions (hooks) on the outer ring. A number of protrusions are available in the longitudinal direction. The risk of such constructions is that the protrusion breaks off when force is applied thereto.

An object of the invention is to provide a system of complementary fastening elements, using which a screw thread connection can be realized relatively quickly and wherein the screw thread connection has a strength which is comparable to that of a conventional screw thread connection and is thereby suitable for the same applications, including professional applications such as construction and machinery.

SUMMARY OF THE INVENTION

Provided for this purpose in a first aspect of the invention is a system of fastening elements formed by a coupling rod and a nut, wherein a first fastening element comprises a screw thread profile and wherein the second fastening element comprises a base body and is provided with a plurality of resilient tongues adapted for co-action with the screw thread profile for the purpose of forming a screw thread connection between the two fastening elements. At least a number of the plurality of tongues are distributed substantially uniformly here over a peripheral side of the second fastening element. The tongues are attached to the second fastening element such that rotationless translation of the nut arranged round the coupling rod is possible in one longitudinal direction of the coupling rod and is prevented in an opposite longitudinal direction. The second fastening element comprises a substantially annular support structure connected to the base body and provided with the resilient tongues, wherein the resilient tongues are situated on an inner side of the support structure.

In a second aspect of the invention a fastening element is provided for use in the system which is provided with the annular support structure provided with tongues. The fastening element can be both the coupling rod and the nut. It is recommended that the fastening element according to the invention is the nut.

In a third aspect of the invention a system and a fastening element are provided, wherein a first fastening element comprises a screw thread profile and wherein the second fastening element comprises a base body and is provided with a plurality of resilient tongues adapted for co-action with the screw thread profile for the purpose of forming a screw thread connection between the two fastening elements. At least a number of the plurality of tongues are herein distributed substantially uniformly over a peripheral side of the second fastening element, wherein rotationless translation of the nut arranged round the coupling rod is possible in one longitudinal direction of the coupling rod through resilient movement of the tongues and is prevented in an opposite longitudinal direction. The tongues here form part of a substantially annular blade which, at least during use of the system, is situated in an annular space with a width between a first part of the base body and the screw thread profile, and which annular blade extends in a flat configuration in radial direction through a distance greater than the width of the annular space such that, during transition from an unloaded state to a clamping state, in which the blade is present in the flat configuration, the blade is clamped between the screw thread profile and the first part of the base body with resulting mechanical anchoring in the base body.

In a fourth aspect according to the invention a method is provided for realizing a screw thread connection using a system or a fastening element according to the invention. The method comprises the steps of:

arranging at least a part of the nut in a predefined orientation round the coupling rod, displacing the nut arranged around the coupling rod in substantially rotationless manner relative to the coupling rod in a first longitudinal direction of the coupling rod up to or close to a stop surface for the nut and/or the coupling rod, and causing the nut and/or the coupling rod to engage under bias on the stop surface by displacing the nut relative to the coupling rod by means of rotation of the nut relative to the coupling rod.

A fifth aspect according to the invention provides the use of the system or the fastening element according to the invention to realize a screw thread connection. Here the nut is first displaced in substantially rotationless manner relative to the coupling rod in a first longitudinal direction of the coupling rod to a desired position, this rotationless displacement taking place during resilient movement of the resilient tongues, and wherein the nut is then displaced by means of rotation such that at least a first of the resilient tongues comes to lie substantially flat and the support structure is clamped between the base body and the screw thread profile, wherein the support structure fixes itself into the base body.

The invention is based on the insight that for an improved strength the resilient tongues must be clamped in radial direction between the base body and the screw thread profile. It is precisely due to the clamping in a flat configuration that a static over-determination is obtained, which makes the realized screw thread connection insensitive to vibrations etc. In order to realize such a clamping the tongues form part of a larger support structure, in particular a blade. The use of a support structure or blade in the form of a single element is deemed to be most advantageous in making the force effect of the clamping as uniform as possible. This moreover provides a minimum number of parts, this being favourable for assembly. It will however be apparent to the skilled person that mechanically fixed support structures can also be obtained by suitable mutual coupling of a plurality of elements. Where mention is made in the following to a support structure, reference is thereby also made to the blade.

The support structure is in particular annular and thereby uniform in the peripheral direction. The substantially annular support structure or blade is preferably also continuous, although a division into for instance two to four parts is in principle not precluded. A possible division should not however prevent an efficient clamping; experimental research leading up to the invention has shown that a division may result in shearing of the blade or support structure, i.e. in the peripheral direction instead of in the radial direction. This results in a reduced clamping and thereby a rapidly decreasing strength.

For an efficient translation along the resilient tongues it is recommended that in an unloaded state the resilient tongues enclose an angle with the longitudinal axis of the second fastening element of between 0 and 90 degrees.

Once the second fastening element has been pushed relatively quickly and easily to or close to a desired position relative to the first fastening element, the second fastening element can be rotated—generally one or several turns— relative to the first fastening element, or vice versa, in order to eventually enable realization of a clamping and reliable screw thread connection.

For an efficient clamping of the support structure or blade it is favourable for a stop surface to be present in the second fastening element. This stop surface forms here a transition between a first part and a second part of the support body. This can be further explained with reference to the preferred embodiment in which the second fastening element is formed by the nut. The nut is provided with an annular space through which the coupling rod can be inserted. The first part of the nut herein has a first inner diameter and the second part of the nut has a second inner diameter. The second inner diameter is smaller; the upper surface of the second part preferably forms said stop surface. The second diameter is preferably chosen so as to be minimal, e.g. such that it matches the outer diameter of the screw thread profile with negligible play therebetween. The first diameter is chosen in combination with the width of the support structure, which preferably falls within this first diameter. The width of the support structure is here the distance between an inner side and an outer side of the annular support structure. This width is in particular just greater than the radial distance between the screw thread profile (particularly the groove, here the inner diameter) and the first part of the base body. The ratio of said width and said radial distance is preferably a maximum of 1.2, preferably a maximum of 1.1, more preferably 1.05 or smaller. This ratio can of course be even smaller, for instance 1.02 or smaller, which does however require the dimensions of the bolt and nut to be realized very accurately.

It is noted that the first part of the base body can also take the form of a cavity, in which the outer side of the support structure is positioned. Such a cavity effectively determines the position of the support structure along the longitudinal axis. Positioning the outer side of the support structure in a cavity can for instance be realized by bending, particularly when the support structure is divided on the outside, for instance by arranging channels as will be further elucidated below.

The system and the fastening element according to the invention have the advantage compared to conventional systems that a similar strength is obtained, while the screw thread connection can be realized more quickly. This makes the system particularly advantageous for application in repair of machines, motors and vehicles, such as ships, aircraft, trains and automobiles. In such cases the tightening of nuts onto bolts represents a brake on the productivity which can be achieved. In addition, the system according to the invention is also highly suitable for applications in which the screw thread is damaged or can become damaged. An example hereof are applications in construction, wherein concrete or cement soil the screw thread. The system can be applied very well here, also because it meets the demands in respect of strength; not only is placing of the nut onto the bolt possible due to the rotationless translation, nor is the strength dependent on an undamaged screw thread owing to the clamping, particularly with mechanical anchoring.

The system is particularly suitable for applications in which a securing action is required, particularly applications in which a securing connection against for instance vibrations and/or frequencies is necessary. This advantageous field of application results from the inherent resilient action in the invention. It is further noted that this securing action can be maintained for a period of years, particularly when the fastening element or the system consists substantially of metal and spring steel (i.e. with the exception of possible coatings). The securing action is also found to be maintained in environments with high temperatures, again particularly in the case where the fastening element or the system consists substantially of metal and spring steel.

In a specific and important embodiment the substantially annular support structure is provided with first channels on the inner side and with second channels on the outer side, which first and second channels are mutually offset. The presence of the first channels on the inner side effectively creates the resilient tongues. The second channels provide for improved stability. It has been found particularly that the second channels wholly or largely prevent the support structure slipping away relative to the base body.

In a further variant hereof the support structure with the first and second channels forms a meander-shaped path in which bridges extend between the tongues and an outer ring such that the rotationless translation takes place through bending of the bridges. This variant is favourable because the required bending is partially determined by the shape of the bridges. The material choice and embodiment (for instance the thickness) can hereby be designed with a view to the strength of the entity of tongues and outer ring.

It is further favourable when the meander-shaped path has a width, this width opposite a first channel in radial direction being greater than a minimal width in the peripheral direction. The minimal width will here be particularly localized in the bridges, this between a first channel and a second channel. It has been found that such a design rule reduces or even wholly prevents the risk of cracking or breaking in radial direction opposite a first channel. As an alternative hereto, the outer ring of the support structure can optionally be made thicker, stiffer or otherwise stronger. This does however require specific process steps.

It is moreover favourable for a corner between a second channel and an outer side of the support structure to be substantially non-rounded and preferably a maximum of 90 degrees. This embodiment has the advantage that in the case of mechanical anchoring the support structure can insert itself more easily into the base body; the contact surface, and thereby also the moment of force, is optimized.

The coupling rod will generally be provided with an external screw thread, whereby the coupling rod in fact forms a threaded rod. The threaded rod can here form part of a bolt, wherein the bolt forms the first fastening element and the nut forms the second fastening element, whereby a nut-bolt connection can be realized. In this embodiment of the system according to the invention the nut is thus provided with resilient tongues. The fastening element provided with the one or more resilient tongues will otherwise generally take a form without screw thread, at least on a side on which or at which the resilient tongues are positioned.

In a particular embodiment the second fastening element comprises at least one closing element, wherein the support structure is enclosed between the base body and the at least one closing element connected to the base body. During assembly of the second fastening element the support body is generally first arranged in or round the base body, after which the base body is enclosed, particularly clamped, by arranging the closing element. Assembly of the modular second fastening element can take place by machine during production, but can optionally also be carried out by a user himself, optionally using tools required for this purpose.

The use of a separate closing element has the additional advantage that this closing element can be used to arrange visual indications relating to quality, origin, type etc.

Alternatives to the use of a closing element for effecting the connection between the support structure and the base body are, among others, the use of adhesive, arranging a preferably matching cavity and so on. The base body and the support structure, particularly the outer side thereof, can also have magnetic properties through the choice of material for the support structure and/or a suitable coating, whereby magnetic attraction to the base body is made possible. A further alternative is formed by arranging protrusions on the base body such that these protrusions drop into channels in the support structure. These channels can be both the first and the second channels. Care is preferably taken during design that the support structure can nevertheless move to some extent in radial direction during clamping.

In an advantageous embodiment the support structure is manufactured at least partially from spring steel. Spring steel is a material which remains resilient for a relatively long time without metal fatigue occurring quickly, and is moreover sufficiently strong to enable realization of a reliable screw thread connection.

The invention further relates to a method for realizing a screw thread connection using a system according to the invention, comprising of: A) arranging at least a part of the nut in a predefined orientation round the coupling rod, B) displacing the nut arranged round the coupling rod in substantially rotationless manner relative to the coupling rod in a first longitudinal direction of the coupling rod up to or close to a stop surface for the nut and/or the coupling rod, C) causing the nut and/or the coupling rod to engage under bias on the stop surface by displacing the nut relative to the coupling rod by means of rotation of the nut relative to the coupling rod. The stop surface can here form part of the nut and/or of the coupling rod. It is however also possible to envisage the stop surface forming part of an object to be clamped (fastened). During tightening of the nut (and/or the coupling rod) during step C) the at least one resilient tongue will engage under bias on the screw thread profile, whereby the at least one resilient tongue will deform and a reliable screw thread connection can be realized.

In the method according to the invention the resilient tongues can be positioned on an inner side of the nut, and wherein the screw thread is provided on the outer side of the coupling rod. The inner side of the nut will here be embodied without screw thread. The coupling rod, particularly the threaded rod, can here form part of a bolt. It is also possible to envisage a mechanically reverse situation, wherein a (conventional) nut provided with an internal screw thread is applied and wherein the at least one resilient tongue is arranged on an outer side of the coupling rod. The coupling rod will be embodied here wholly without screw thread, or at least so in the vicinity of the at least one resilient tongue.

It is noted here for the sake of completeness that the favourable embodiments and variants described in the sub-claims and above can be combined in all aspects, even when this is not explicitly stated,

BRIEF DESCRIPTION OF THE FIGURES

The invention will be elucidated on the basis of non-limitative exemplary embodiments shown in the following figures. Herein.

DEFINITIONS

The following definitions are intended by way of explanation for terms used in this application. A screw thread connection is understood to mean a connection between a first connecting element with a screw thread profile and a second connecting element such that the first and the second connecting elements are positioned relative to each other, wherein the tongues or screw thread of the second connecting element engage on the screw thread profile of the first connecting element. The term 'screw thread' must be understood to include any screw thread and like thread typically used for the connection of a bolt and a nut, including imperial nuts and metric nuts.

The connection of a basic body and support structure is understood to mean that in normal use the support structure is not releasable from the base body. The term does not require the support structure and the base body to be fixed to each other with a direct mechanical or chemical connection. The term does not preclude any movement being possible, at least of parts of the support structure, particularly in radial direction relative to an axis.

A substantially annular support structure is understood to mean a support structure which is provided with a central opening and has an inner side and an outer side and extends in the peripheral direction. The substantially annular support structure is not precluded from being divided into for instance two to four parts, although this is not recommended. The annular form can be round, but may also have a different form on the inner side and/or the outer side, such as rectangular, hexagonal, octagonal, etc. It is preferably a form which is symmetrical around a longitudinal axis. The annular form does not preclude channels being present on the inner side and on the outer side. In the direction of the longitudinal axis the annular support structure is preferably plate-like, wherein in unloaded state parts of the annular support structure, particularly the resilient tongues, can enclose an angle relative to the longitudinal axis.

A resilient tongue is understood to mean an element which is substantially elastically movable and/or bendable in one or more directions and which has a certain extension (depth) particularly in the peripheral direction. The resilient movement of the resilient tongue can be caused by bending and/or resilience in the tongue itself, but also by bending and/or resilience of one or more connections to the resilient tongue. A resilient tongue as used in the invention preferably has at least two connections to further parts of the support structure.

A stop surface is understood to mean a surface against which the support structure can lie such that when external pressure is applied the support structure is pulled substantially straight along the surface.

DETAILED DESCRIPTION OF THE FIGURES

The figures are not to scale and of purely schematic nature. The same reference numerals in different figures refer to the same or similar elements.

Figure 1A:
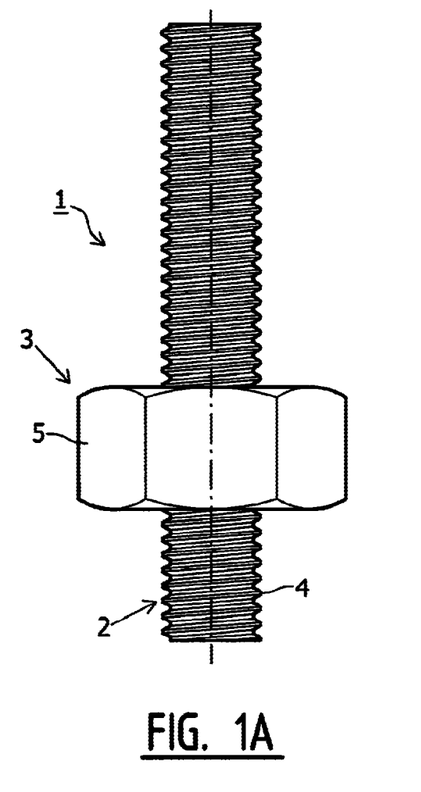
FIG. 1a is a side view of a system of a threaded rod and a nut according to the invention.
Figure 1B:
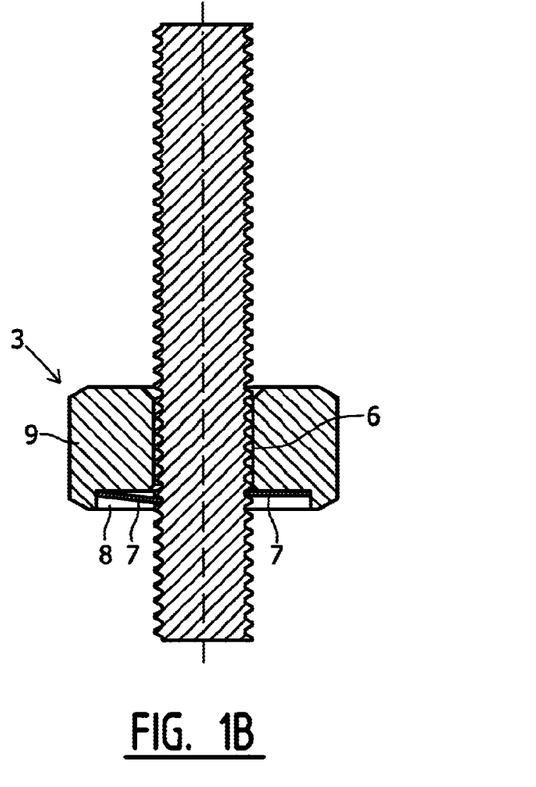
FIG. 1b shows a cross-section of the system according to FIG. 1a, FIG. 1c shows a spring for use in the system according to FIG. 1a, FIG. 1d shows a detailed cross-section of a part of the system according to FIG. 1a, FIG. 2a is a perspective view of another nut according to the invention.
Figure 1C:
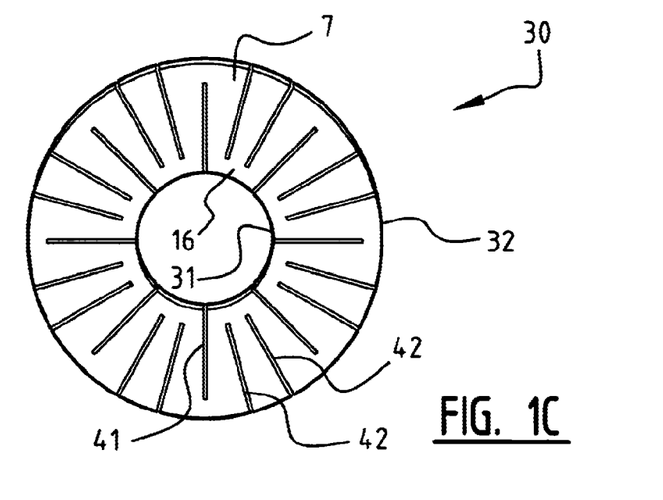
Figure 1D:
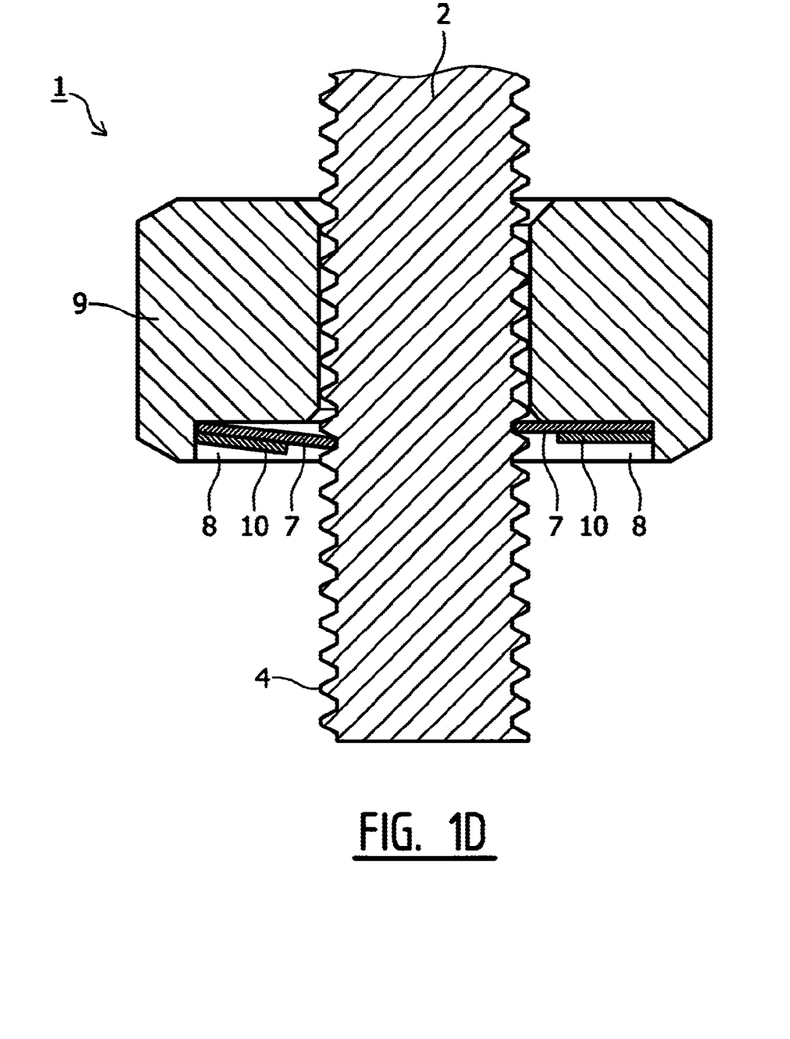

FIG. 1a shows a side view of a system 1 of a threaded rod 2 and a nut 3 according to the invention. The threaded rod takes a cylindrical form here and is provided with an external (trapezium) screw thread profile 4. An outer side 5 of nut 3 has a hexagonal cross-sectional form. An inner side 6 of nut 3 is not provided with a conventional screw thread profile but is provided with a plurality of resilient tongues 7 (see FIG. 1b) which are adapted for co-action with the external screw thread profile 4 for the purpose of realizing a screw thread connection. By causing nut 3 to rotate relative to threaded rod 2 the nut 3 can be displaced (screwed)—in conventional manner—in axial direction relative to threaded rod 2. However, because resilient tongues 7 are adapted to deform in one axial direction, in the shown orientation the downward direction, nut 3 can be displaced substantially linearly relative to threaded rod 2 without rotation. Nut 3 can thus be displaced to a desired position on threaded rod 2 relatively quickly and easily, after which nut 3 can be tightened further by means of rotation relative to threaded rod 2. Because resilient tongues 7 can be deformed in only one direction, a linear displacement will be possible in only one direction; displacement in an opposite direction will only be possible by rotating nut 3 relative to threaded rod 2. As shown, nut 3 has a modular construction and comprises a base body 9 provided with a recess 8, wherein resilient tongues 7 are positioned in recess 8. Tongues 7 are generally connected to each other by means of a support structure, this generally being advantageous from a structural and operational viewpoint. A design of support structure 30 with resilient tongues 16 is shown in FIG. 1c. The support structure comprises first channels 41 which extend from the first side or inner side 31. Support structure 30 further comprises second channels which extend from the second side or outer side 32. In this example there are more second channels 42 than first channels 41. Support structure 30, provided with resilient tongues 7, can be enclosed in recess 8 by applying a securing ring 10. Securing ring 10 can be clamped into recess 8, whereby tongues 7 can be secured (see FIG. 1d). Resilient tongues 7 will generally be manufactured from spring steel.

Figure 2A:
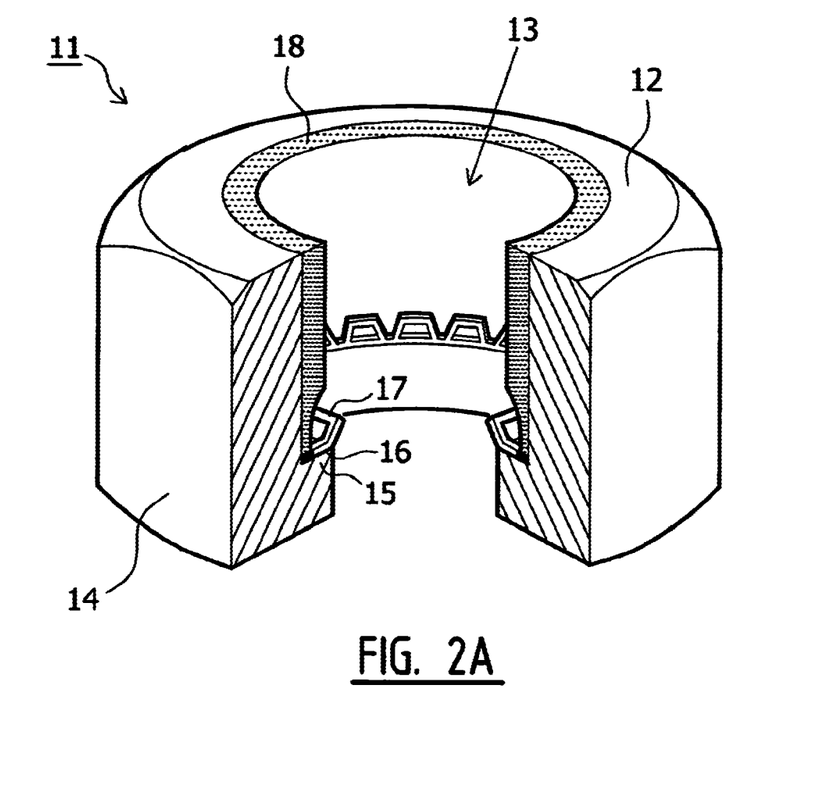
Figure 2B:
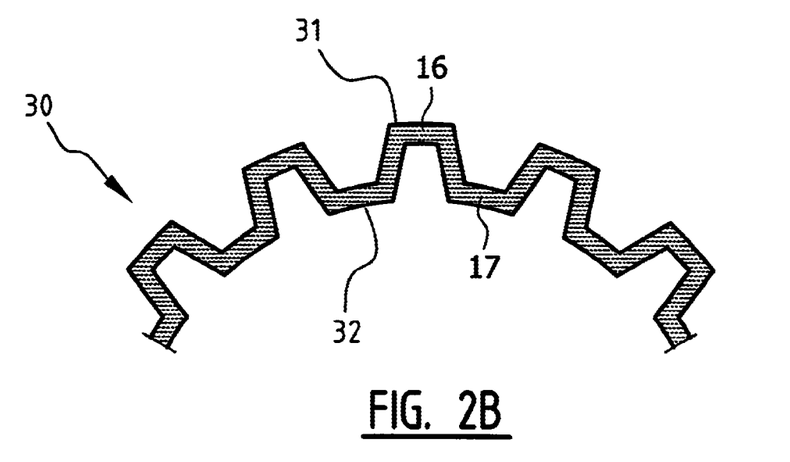
FIG. 2b is a top view of a part of a spring washer for use in the nut according to FIG. 2a, FIG. 2c shows a cross-section of the nut according to FIG. 2a, FIG. 2d shows a cross-section of the nut according to FIG. 2a and a threaded rod arranged in the nut.
Figure 2C:
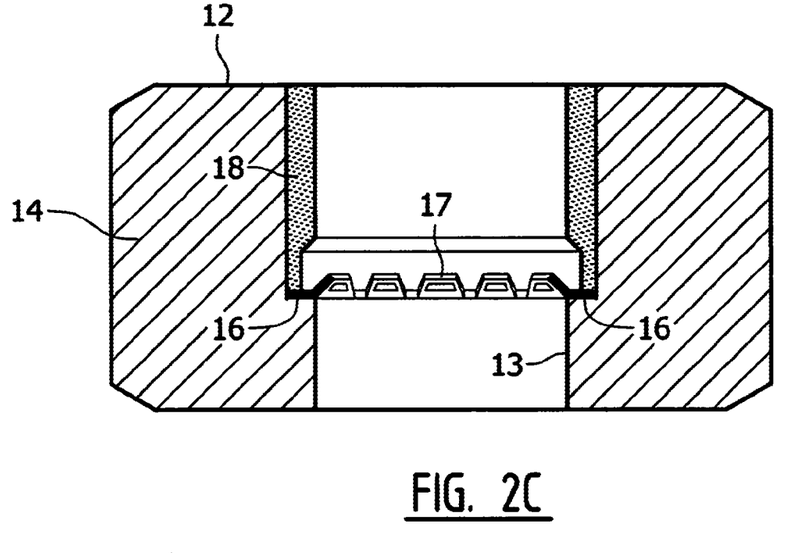
Figure 2D:
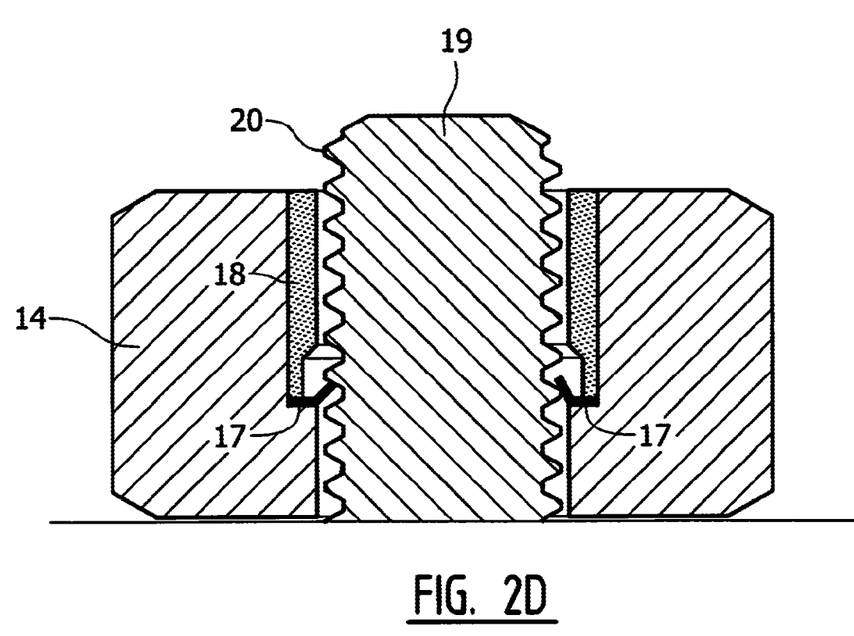

FIG. 2a is a perspective view of another nut 11 according to the invention, a part of which is not shown for the purpose of being able to interpret the figure. In cross-section nut 11 comprises a hexagonal outer side 12 and a round inner side 13. Nut 11 has a modular construction and comprises a base body 14 which takes a widened form on one side so that a stop surface 15 is created on which is arranged an annular support structure 16 provided with a plurality of resilient tongues 17. Support structure 16 is shown in detail in FIG. 2b. Support structure 16 is enclosed in base body 14 by applying an annular bush 18 which is pushed into base body 14 as closing element and does in fact as such secure support structure 16, wherein the orientation of support structure 16, and thereby of tongues 17, is fixed relative to base body 14. Annular bush 18 will generally be connected rigidly to base body 14 through clamping. Resilient tongues 17 enclose an angle with a longitudinal axis of nut 11, whereby linear displacement of a complementary threaded rod through nut 11 is possible in one axial direction and is prevented in an opposite axial direction, similarly to system 1 shown in FIG. 1a. FIG. 2b shows that tongues 17 and support structure 16 are integrally connected to each other and form as such a kind of toothed spring washer. FIG. 2c shows a cross-section of nut 11 according to FIG. 2a which shows clearly that bush 18 clamps support structure 16 provided with resilient tongues 17 into base body 14. When a threaded rod 19 provided with an external screw thread profile 20 is arranged in nut 11, threaded rod 19 can be pulled in upward direction without herein necessarily having to rotate. If threaded rod 19 is then pulled linearly in downward direction, tongues 17 will then deform and fix themselves in screw thread profile 20, whereby further displacement is prevented (see FIG. 2d).

Figure 3:
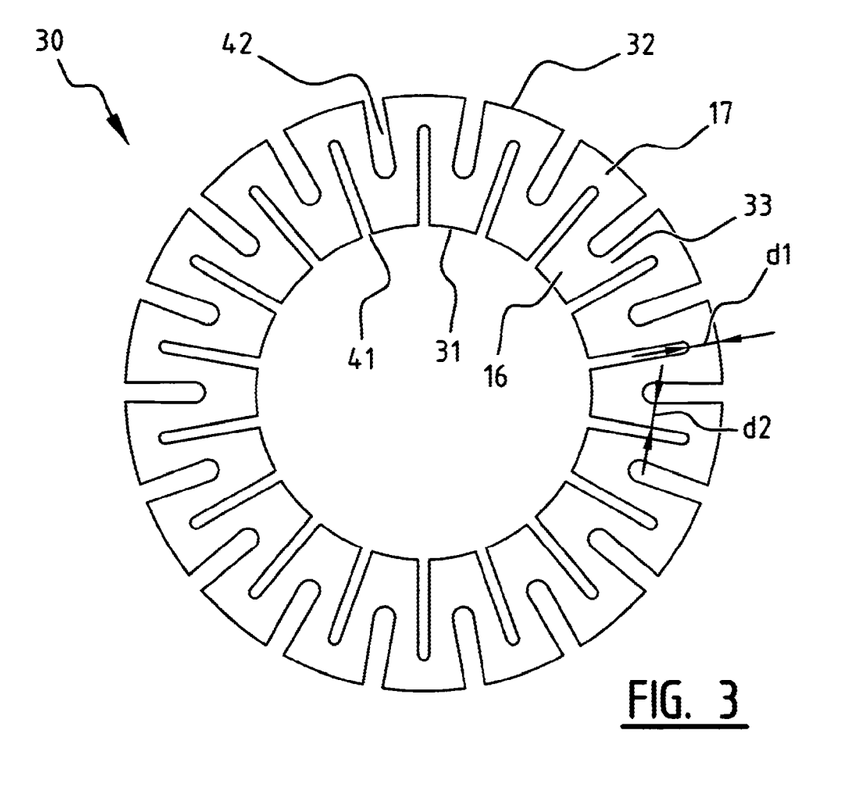
FIG. 3 is a top view of the support structure of the fastening element according to the invention.

FIG. 3 is a schematic top view of a further embodiment of support structure 30. The structure is annular and extends between an inner side (first side) 31 and an outer side (second side) 32. First channels 41 are arranged extending from inner side 31. Second channels 42 are present from outer side 32. First and second channels 41, 42 are offset relative to each other. They have a length relative to the overall width of support structure 30 such that they are arranged partially parallel. The support structure is hereby formed as a meander-shaped path comprising resilient tongues 16, bridges 33 and a segmented outer ring 17. The design is chosen here such that bending of resilient tongues 16 takes place particularly at the position of bridges 33. In order to guarantee a stability against great forces, care is taken in the design that the diameter d1, which extends radially in line with a first channel 41, is greater than the diameter d2 extending in the peripheral direction on the part identified as bridge 33. As will be found from looking at FIGS. 4-7, outer ring 17 is particularly connected to the base body, while in unloaded state the resilient tongues 16 are oriented upward.

Figure 4:
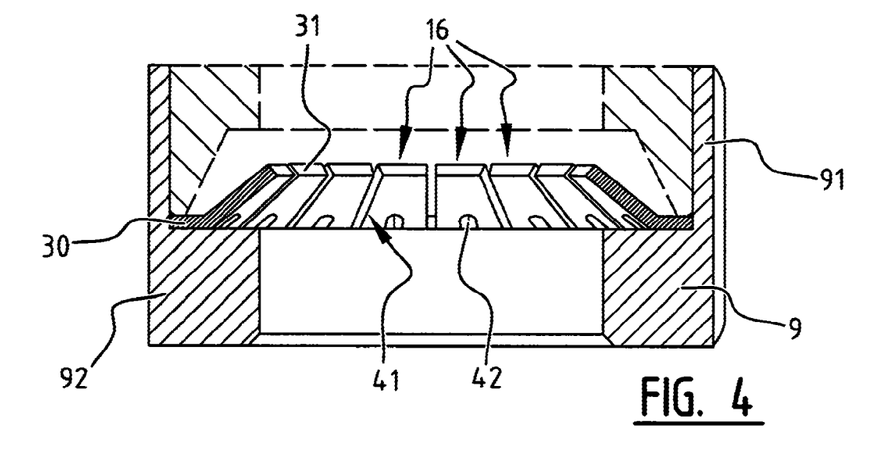
FIG. 4 is a further cross-section of a nut according to the invention which shows the support structure according to FIG. 3, FIGS. 5 and 6 show cross-sections of two successive stages in the fastening of a nut to a bolt.

FIG. 4 shows a schematic section of a fastening element 50, in particular a nut. Fastening element 50 comprises a base body 9 comprising a first part 91 and a second part 92. First part 91 and second part 92 have diameters such that second part 92 extends inside the first part. The upper surface of second part 92 (identified in FIG. 7 with numeral 93) is for this purpose a support surface for support structure 30. As will become apparent, this surface also forms the stop surface. This FIG. 4 clearly shows that resilient tongues 16 are oriented at an oblique angle relative to the longitudinal axis of the nut. First side 31 here protrudes forward. Second channels 42 are still just visible, which makes it clear that bending has occurred, particularly at the position of the bridges (not identified in FIG. 4). An outer ring of support structure 30 lies flat. This ring is connected in advantageous manner to base body 9, for instance via a closing element, which is not shown here for the sake of clarity. It is noted for the sake of clarity that the broken lines in the drawing show parts of the nut located to the rear.

Figure 5:
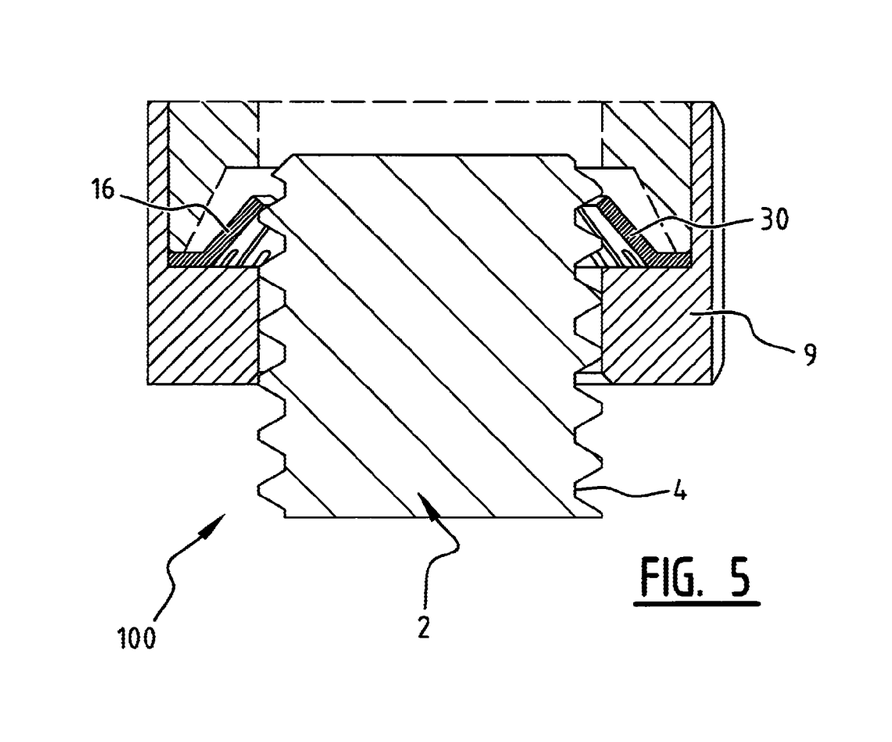

FIG. 5 shows a schematic section of system 100, wherein a bolt 2 with screw thread 4 is pushed through the nut by means of rotationless translation in a first longitudinal direction (upward from below in the drawing). It is noted that resilient tongues 16 are here bent further. It is further noted that a close fit is realized between the nut and screw thread 4 in that the corners of second part 92 of the base body are not flattened on the stop surface, as is usual. The effective length of the resilient tongues is hereby limited, this enhancing the strength.

Figure 6:
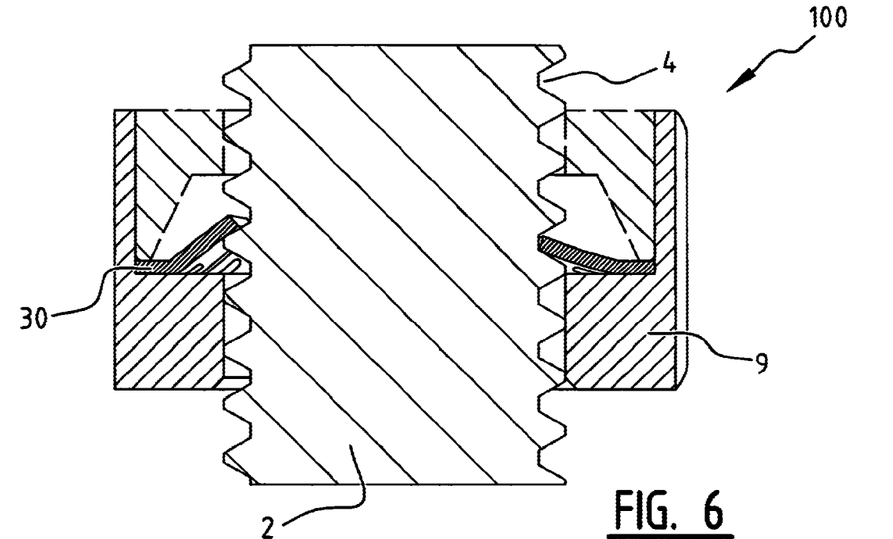

FIG. 6 shows a schematic section of the system at a further stage of the method according to the invention, wherein rotation takes place and a displacement in the opposite longitudinal direction (i.e. downward from above in the drawing) eventually takes place. The bending angle of resilient tongues 16 decreases as a result of this rotation. As shown herein, the resilient tongues here engage in the screw thread. This has the result that the tongues do not all bend to the same extent at the same moment: the bending angle on the left is greater than that on the right.

Figure 7:
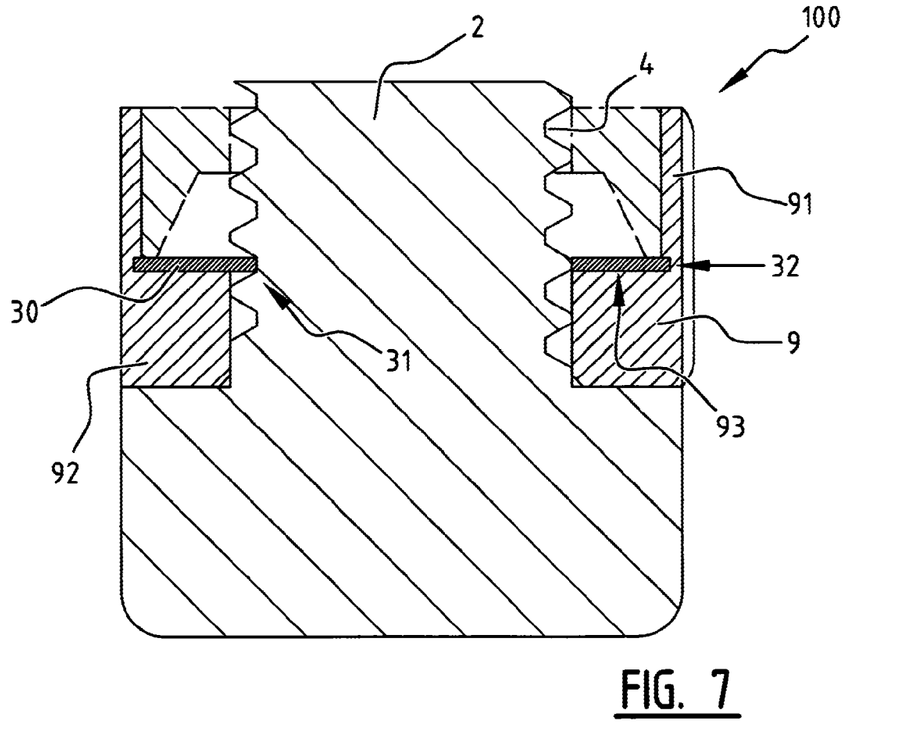
FIG. 7 shows a cross-section of a resulting connection.

FIG. 7 shows a schematic section of the system in which a screw thread connection is formed. The whole support structure 30, including resilient tongues, herein lies flat against stop surface 93. Because the width of support structure 30 is effectively greater than the distance between first part 91 of base body 9 and screw thread profile 4, a force is created in combination with the flat position. This results in outer side 32 of support structure 30 becoming anchored in base body 9.

It will be apparent that the invention is not limited to the exemplary embodiments shown and described here, but that numerous variants which will be self-evident to the skilled person in this field are possible within the scope of the appended claims.

The invention claimed is:

1. A system of fastening elements comprising:
   a coupling rod having a screw thread profile on an outer side thereof; and
   a nut comprising:
      a base body including a substantially annular support structure; and
      a plurality of resilient tongues on an inner side of the support structure configured to co-act with the screw thread profile for the purpose of forming a screw thread connection between the nut and the coupling rod, at least a number of the tongues being distributed substantially uniformly over a periphery of the support structure;
   wherein the tongues engage the nut such that rotationless translation of the nut with respect to the coupling rod is possible in one longitudinal direction of the coupling rod and is prevented in an opposite longitudinal direction;
   wherein in an unloaded state the plurality of resilient tongues enclose an angle with a longitudinal axis of the coupling rod between 0 and 90 degrees; and
   wherein in a clamping state the plurality of tongues engage the screw thread profile of the coupling rod, and a first tongue of the resilient tongues encloses substantially a right angle with the longitudinal axis of the coupling rod, and an outer side of the support structure, at least where it is connected to the first tongue, fixes itself into the base body.

2. The system as claimed in claim 1, wherein the substantially annular support structure is provided with first channels on the inner side and with second channels on the outer side, which first and second channels are mutually offset.

3. The system as claimed in claim 2, wherein the support structure with the first and second channels forms a meander-shaped path in which bridges extend from the tongues to areas at the outer side such that the rotationless translation takes place through bending of the bridges.

4. The system as claimed in claim 3, wherein the meander-shaped path has a width, this width opposite one of the first channels in a radial direction being greater than a minimal width in the peripheral direction.

5. The system as claimed in claim 2, wherein the second channels have a greater width than the first channels.

6. The system as claimed in claim 2, wherein a corner between a second channel and an outer side of the support structure is substantially non-rounded.

7. The system as claimed in claim 6, wherein the corner has a maximum of 90 degrees.

8. The system as claimed in claim 1, wherein the base body has a stop surface against which the support structure lies when the screw thread connection is formed, this stop surface forming a transition between a first part and a second part in the longitudinal direction with mutually differing diameters.

9. The system as claimed in claim 1, wherein the nut includes at least one closing element connected to the base body, wherein the support structure is enclosed between the base body and the at least one closing element connected to the base body.

10. The system as claimed in claim 1, wherein the support structure is manufactured at least partially from spring steel.

11. A method for realizing a screw thread connection using a system as claimed in claim 1 comprising:
   A) arranging at least a part of the nut in a predefined orientation round the coupling rod,
   B) displacing the nut arranged around the coupling rod in substantially rotationless manner relative to the coupling rod in a first longitudinal direction of the coupling rod up to or close to a stop surface for the nut and/or the coupling rod,
   C) causing the nut and/or the coupling rod to engage under bias on the stop surface by displacing the nut relative to the coupling rod by means of rotation of the nut relative to the coupling rod.

12. Use of a system as claimed in claim 1 for realizing a screw thread connection, wherein the nut is first displaced in substantially rotationless manner relative to the coupling rod in a first longitudinal direction of the coupling rod to a desired position, this rotationless displacement taking place during at least resilient movement of the resilient tongues, and wherein the nut is then displaced by means of rotation such that at least a first of the resilient tongues comes to lie substantially flat and the support structure is clamped between the base body and the screw thread profile, wherein the support structure fixes itself into the base body.

13. A nut for use in a system with a coupling rod having a screw thread profile so as to form a screw thread connection between the nut and the coupling rod, comprising:
   a base body including a substantially annular support structure; and
   a plurality of resilient tongues on an inner side of the support structure configured to co-act with the screw thread profile for the purpose of forming a screw thread connection between the nut and the coupling rod, at least a number of the tongues being distributed substantially uniformly over a periphery of the support structure;
   wherein the tongues engage the nut such that rotationless translation of the nut with respect to the coupling rod is possible in one longitudinal direction of the coupling rod and is prevented in an opposite longitudinal direction;
   wherein in an unloaded state the plurality of resilient tongues enclose an angle with a longitudinal axis of the coupling rod between 0 and 90 degrees; and
   wherein in a clamping state the plurality of tongues engage the screw thread profile of the coupling rod, and a first tongue of the resilient tongues encloses substantially a right angle with the longitudinal axis of the coupling rod, and an outer side of the support structure, at least where it is connected to the first tongue, fixes itself into the base body.

\* \* \* \* \*